S. Clegg,
Gas Meter,
N°. 32,049. Patented Apr. 16, 1861.
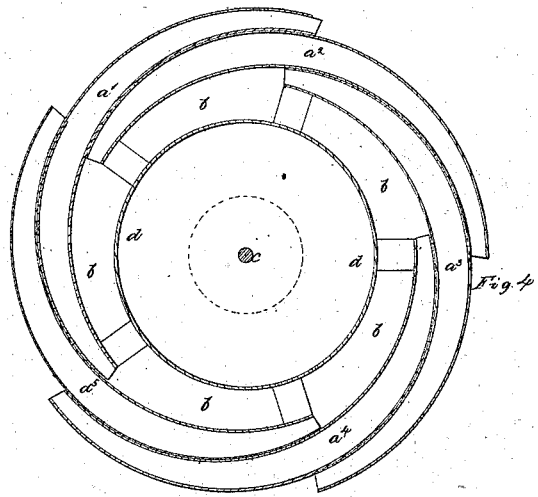
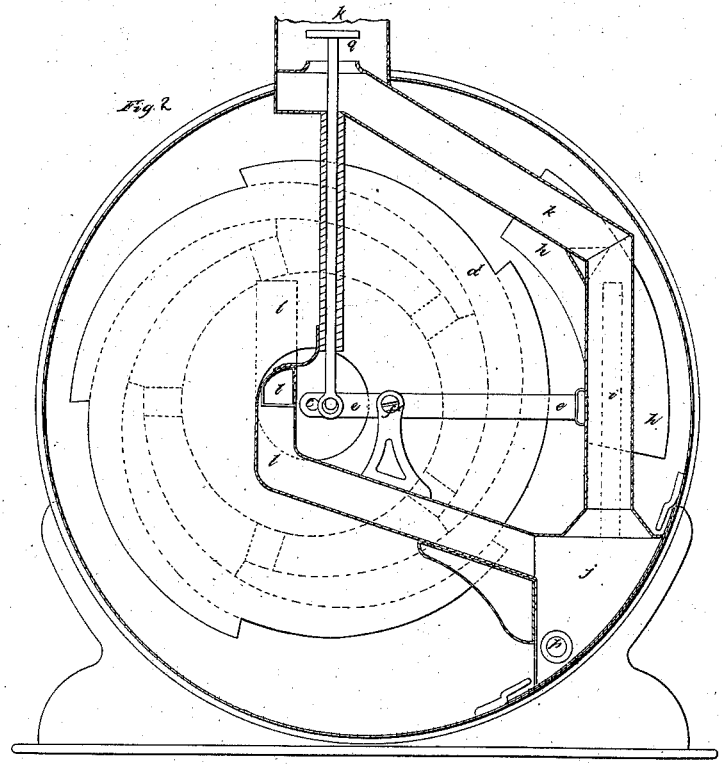
Witnesses.
Geo. Witt
Jno. Alcock
Inventor:
Samuel Clegg

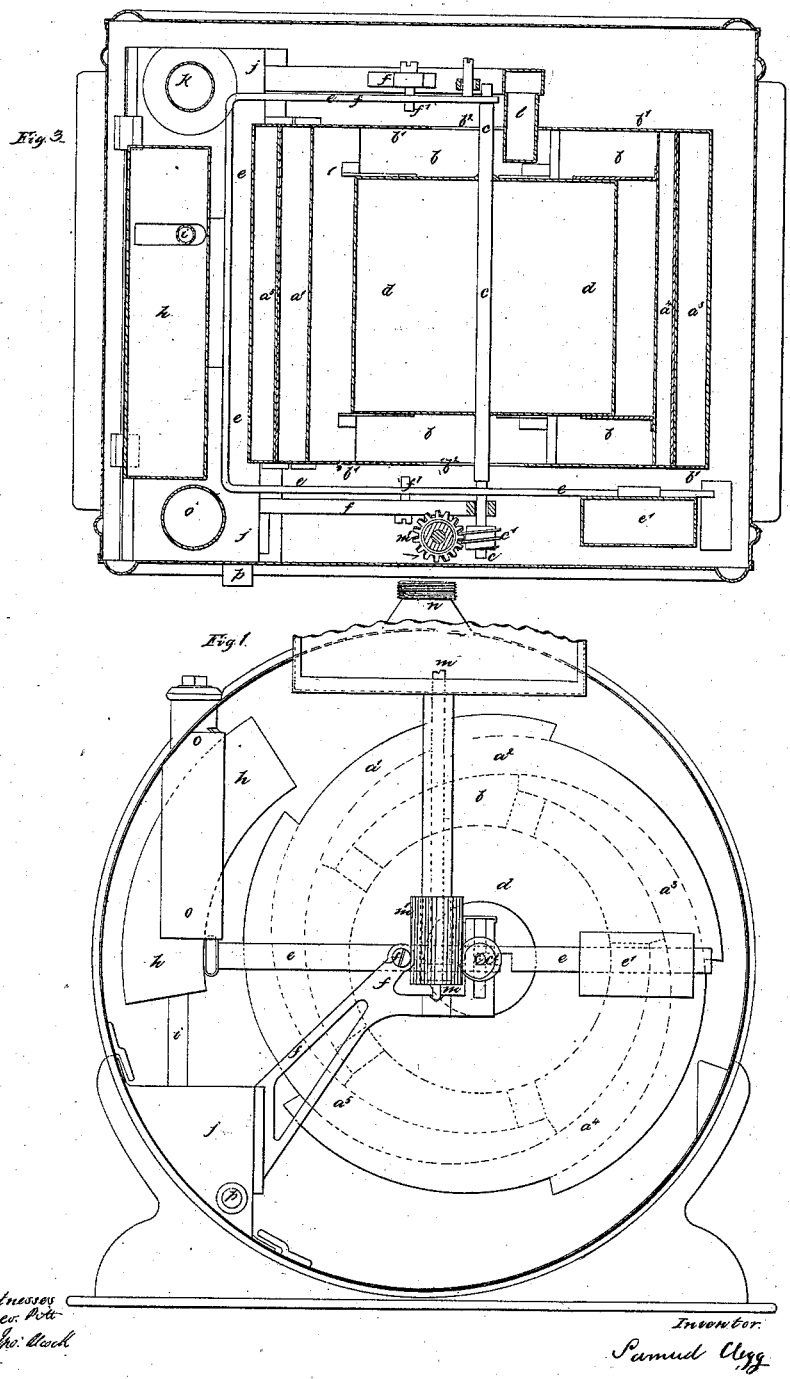

UNITED STATES PATENT OFFICE.

SAMUEL CLEGG, OF DOVER COTTAGE, COUNTY OF SURREY, ENGLAND.

IMPROVEMENT IN GAS-METERS.

Specification forming part of Letters Patent No. 32,049, dated April 16, 1861.

*To all whom it may concern:*

Be it known that I, SAMUEL CLEGG, of Dover Cottage, Putney, in the county of Surrey, England, a subject of the Queen of Great Britain, have invented or discovered new and useful Improvements in Gas-Meters; and I, the said SAMUEL CLEGG, do hereby declare that the nature of the said invention and in what manner the same is to be performed are particularly described and ascertained in and by the following statement thereof—that is to say—

This invention has for its object improvements in gas-meters. For these purposes, in constructing the drum of a gas-meter the measuring-chambers are arranged around the periphery of the drum and a space is left surrounding the axis into which the unmeasured gas is supplied before it enters the measuring-chambers. These chambers which pass nearly half-round the drum are open at both ends, one end of each chamber communicating with the unmeasured gas in the central space of the drum and serving to admit gas to the chamber, and the other end opening outside the drum and serving to discharge the measured gas into the casing surrounding the drum. The case of the drum and the drum itself are partly filled with water, the water in the one communicating with the water in the other by holes left in the end plates of the drum around the axis. These holes are covered by the water, so that the gas within the drum cannot pass by these holes to the exterior thereof. The measuring chambers, as before mentioned, pass nearly half-round the periphery of the drum, so that the two ends of a chamber cannot both be above the level of the water at the same time. The gas is supplied to the interior of the drum by a bent pipe passing through the water-passage or passage around the axis in one of the end plates of the drum, and within the drum the mouth of this pipe is turned up so as to rise above the water-level. The gas entering the chambers causes the drum to rotate, and the rotation of the drum allows a continuous flow of gas into the case surrounding, from which the gas is led away from the meter to the burners.

In order that the accuracy of the meter may not depend on the level of the water within it, as this level is liable to be disturbed by evaporation and other causes, the drum has a float attached to it and is allowed to float upon the water. The bearings of the drum to admit of this are carried by levers, which are able to turn freely on suitable centers. The float is placed in the interior of the drum, occupying a portion of the unmeasured gas-space within it. This arrangement, however, would not alone insure accuracy, because if the pressure of the unmeasured gas is increased while that of the measured gas remains constant some of the water would be driven out of the drum, which would, consequently, float higher and discharge more gas of this higher pressure than it formerly discharged of the lower. To avoid this, the levers which carry the axis of the drum are continued beyond the centers on which they turn, and at their farther ends they have attached to them an inverted cup or vessel, open at the bottom, and into this vessel unmeasured gas is led by a pipe passing up into it. If then the pressure of the unmeasured gas is increased while the pressure of the measured gas is constant, this cup or vessel tends to float and to depress the drum, and as the area of the cup or vessel and the lengths of the arms of the levers are so proportioned that the upward tendency of the cup or vessel overbalances the upward tendency of the drum to such an extent that the increasing or diminishing the pressure of the unmeasured gas but very slightly affects the water-line within the drum, the increasing the pressure causing the drum to sink deeper into the water and the water within it to rise a little higher, so causing the drum to deliver a somewhat smaller measure of gas at the increased pressure, and this decrease of measure tends to compensate for the compression of the gas by the increase of the pressure.

In order that my said invention may be most fully understood and readily carried into effect, I will proceed to describe the drawings hereunto annexed.

In the drawings, Figure 1 is a front view with the case removed. Fig. 2 is a back view, partly in section. Fig. 3 is a horizontal section of a meter constructed according to my invention. Fig. 4 is a vertical section of the drum shown separately.

$a'$, $a^2$, $a^3$, $a^4$, and $a^5$ are the measuring-chambers forming the periphery of the drum. It will be seen that one of the open ends of each